Aug. 20, 1940.                F. W. YUTZLER                2,212,429
                              WATER SEPARATOR
                              Filed June 3, 1939

INVENTOR.
FRED W. YUTZLER
BY Kwis Hudson & Kent
ATTORNEYS

Patented Aug. 20, 1940

2,212,429

UNITED STATES PATENT OFFICE 2,212,429

WATER SEPARATOR

Fred W. Yutzler, Rome, N. Y., assignor to The Kent Company, Inc., Rome, N. Y., a corporation of New York Application June 3, 1939, Serial No. 277,233

2 Claims. (Cl. 183—41)

This invention relates to water separators that are especially adapted for use in connection with suction apparatus for removing scrub water from a floor.

It is one of the objects of the invention to provide a water separator that will efficiently separate the entrained water from the air and also be equipped with an automatically operating valve whereby the suction will be automatically cut off when the water reaches a predetermined level in the tank, thus preventing an overflow of the water into the suction apparatus.

A further object of the invention is to provide a water separator that will be so constructed that it may be readily taken apart for cleaning.

Figure 1:
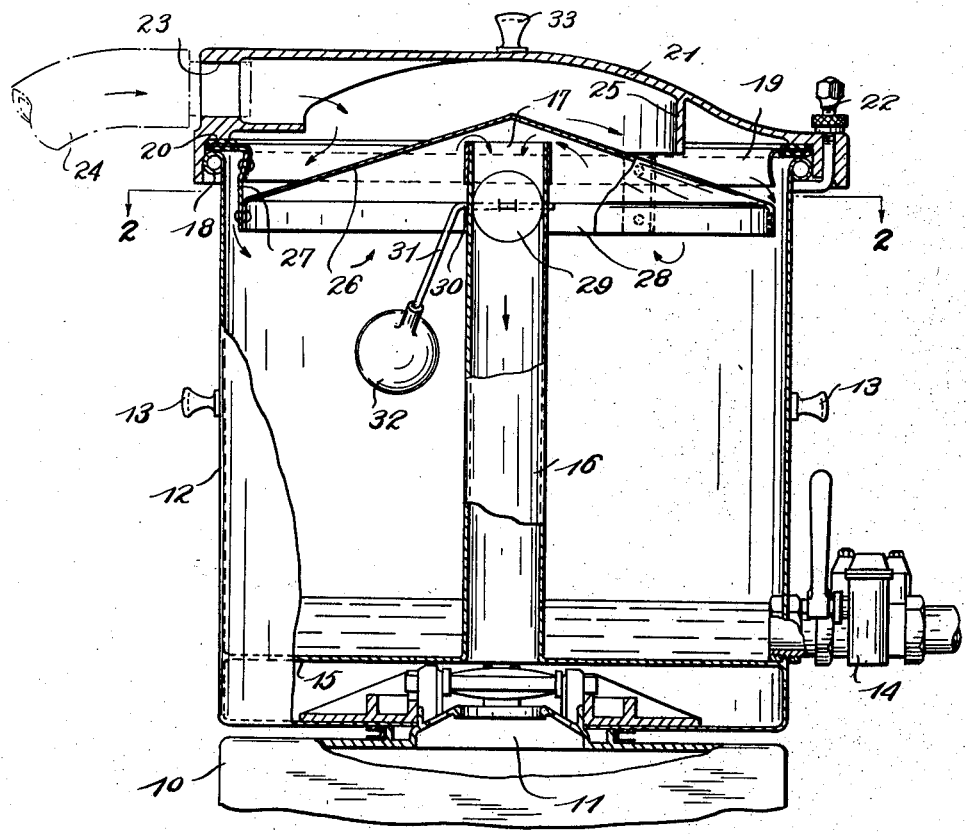
Figure 2:
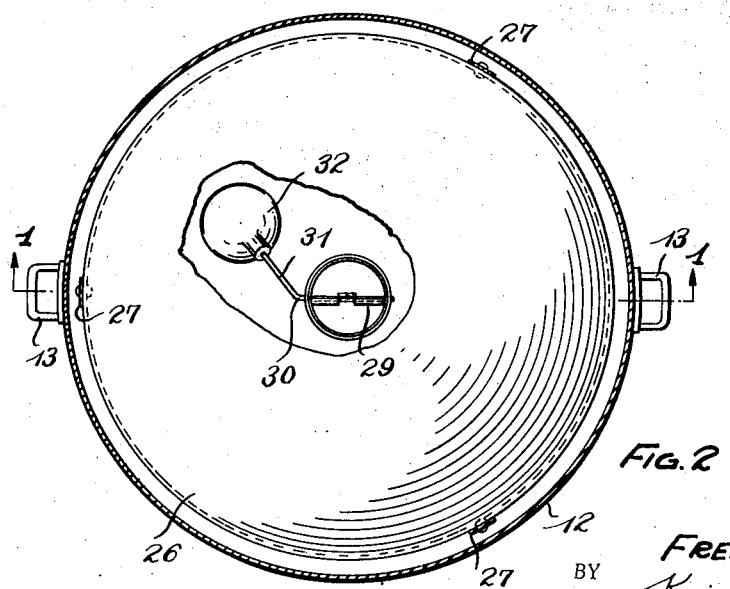

Other objects of the invention and the features of novelty will be apparent from the following description, taken in connection with the accompanying drawing, in which Fig. 1 is a vertical section through a water separator embodying my invention, the section being on line 1—1 of Fig. 2, and Fig. 2 is a transverse section on the line 2—2 of Fig. 1.

Referring to the drawing, 10 indicates, more or less diagrammatically, a suction apparatus having an air intake 11. Mounted on the suction apparatus 10 is a cylindrical tank 12 provided with handles 13 on opposite sides and a discharge valve 14 through which water may be withdrawn from the tank. Centrally arranged on the bottom 15 of the tank is a vertically arranged suction tube or conduit 16 which is in communication with the intake 11 of the suction apparatus. The upper end of the tube or conduit 16 is open, as shown at 17, and arranged adjacent the top of the tank which is preferably provided with a rolled edge or flange 18. A ring 19 having an outwardly extending flange on which a gasket 20 is mounted, rests on the flange 18. A cover 21 rests on the gasket 20 and is secured in position by three or more clamp bolts 22. At one side of the cover 21 there is an intake opening 23 to which a flexible hose 24 may be connected. The hose 24 will be of sufficient length and provided on its end with a suitable nozzle to permit it to be moved over a floor for the purpose of removing water from the floor, by suction, as is common practice in the art. On the interior of the cover there is a downwardly extending circular rib or flange 25.

A conical hood 26 is arranged over the conduit 16 and supported from the ring 19 by means of straps 27, and it will be noted that the hood 26 has a circular flange 28 which is slightly spaced from the interior of the tank 12 to provide a restricted annular opening between the hood and the tank through which the air must pass in flowing from the intake 23 to the upper end of the conduit 16.

A valve 29 is mounted on a pivot 30 and, in general appearance and function, resembles a stovepipe damper. The pivot 30 is extended to form the arm 31 on the end of which there is a float 32. When the float 32 is positioned as shown in Fig. 1 the valve 29 is open so that the suction apparatus 10 may draw air in through the intake 23 and as the air passes around the flange 28 on the hood 26 the water entrained therein will be thrown out and accumulate within the tank. As the level of the water rises in the tank the float 32 will automatically operate to close the valve 29 at a predetermined level and thus cut off the suction and prevent any further air from being drawn through the intake 23. When this occurs, and at any other time desired, the water may be withdrawn from the tank by opening the valve 14 and allowing the water to run out into a suitable receptacle. As the water is discharged from the tank 12 the float 32 will be caused to descend, by the action of gravity thereon, and thus automatically open the valve 29.

By loosening the clamp bolts 22 the cover 21 may be released and removed from the tank, a handle 33 being provided on the top of the cover as a matter of convenience. When the cover has been removed the ring 19 with the hood 26 may be lifted out thereby exposing the interior of the tank so that it may be readily cleaned.

While I have illustrated and described what I now consider to be the preferred form of my invention, it will be understood that various changes may be made in the details of construction that have been illustrated and described without departing from the spirit of the invention as defined in the appended claims.

Having thus described my invention, I claim:

1. In apparatus of the class described, the combination of a tank having a removable cover provided with an air intake, a central discharge conduit for discharging air through the bottom of the tank, a sealing ring between said cover and said tank, a hood carried by said ring and arranged over said discharge conduit for effecting the separation of entrained water from the air, a valve for closing said conduit, means for automatically opening and closing said valve and comprising a float for closing the valve when the water reaches a predetermined level in said tank, and valve-controlled means for discharging water from said tank.

2. In apparatus of the class described, the combination of a tank having a removable cover, a central discharge conduit in said tank and communicating therewith at a point adjacent said cover, a horizontally arranged baffle in the space between the upper end of said conduit and said cover, an air intake from which air is discharged into the space between said baffle and said cover, a valve in said conduit, and means for automatically opening and closing said valve and comprising a float for closing the valve when the water reaches a predetermined level in said tank.

FRED W. YUTZLER.